United States Patent
Xu

(10) Patent No.: US 8,065,434 B2
(45) Date of Patent: *Nov. 22, 2011

(54) METHOD AND DEVICE FOR MAINTAINING ROUTES

(75) Inventor: Xiaohu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/982,733

(22) Filed: Dec. 30, 2010

(65) Prior Publication Data

US 2011/0085554 A1    Apr. 14, 2011

Related U.S. Application Data

(63) Continuation of application No. 12/863,103, filed on Jul. 23, 2010, which is a continuation of application No. PCT/CN2008/072244, filed on Sep. 2, 2008.

(30) Foreign Application Priority Data

Sep. 17, 2007 (CN) .......................... 2007 1 0154506

(51) Int. Cl.
*G06F 15/173* (2006.01)

(52) U.S. Cl. .................................................. 709/244

(58) Field of Classification Search .................. None
See application file for complete search history.

(56) References Cited

U.S. PATENT DOCUMENTS

| | | | |
|---|---|---|---|
| 7,305,464 B2 * | 12/2007 | Phillipi et al. ................ | 709/223 |
| 7,522,603 B2 | 4/2009 | Vasseur | |
| 7,778,165 B2 * | 8/2010 | Madhyastha et al. ......... | 370/229 |
| 7,796,607 B2 * | 9/2010 | Gerber et al. ............ | 370/395.31 |
| 2003/0169747 A1 | 9/2003 | Wang | |
| 2004/0003070 A1 | 1/2004 | Fernald et al. | |
| 2005/0001302 A1 | 1/2005 | Tanie et al. | |
| 2005/0021863 A1 | 1/2005 | Jungck | |
| 2005/0048962 A1 | 3/2005 | Wan et al. | |
| 2005/0159969 A1 * | 7/2005 | Sheppard ......................... | 705/1 |

(Continued)

FOREIGN PATENT DOCUMENTS

CN            1235450 A       11/1999

OTHER PUBLICATIONS

Zhang et al., "Scaling IP Routing with the Core Router-Integrated Overlay", Nov. 2006, IEEE Xplore, pp. 147-156.*

(Continued)

*Primary Examiner* — Minh-Chau Nguyen
(74) *Attorney, Agent, or Firm* — Conley Rose, P.C.; Grant Rodolph

(57) ABSTRACT

A method, system, and device for maintaining routes are provided. A communications network includes multiple point of presence (PoP) groups, where each of the PoP groups includes one or more PoP nodes. PoP nodes within the same PoP group issue routing information of the same super prefix. PoP nodes within different PoP groups issue routing information of different super prefixes. The method further includes the following steps. A PoP node acquires routing information of a detailed prefix covered by a super prefix issued by the PoP node and synchronizes the routing information of the detailed prefix with other PoP nodes within the same PoP group. The method, system, and device reduce flow of data forwarded by each PoP node.

8 Claims, 3 Drawing Sheets

U.S. PATENT DOCUMENTS

2005/0201302 A1    9/2005  Gaddis et al.
2007/0053342 A1*   3/2007  Sierecki et al. ............... 370/351

OTHER PUBLICATIONS

Foreign Communication from a counterpart application, PCT Application PCT/CN2008/072244, Written Opinion dated Dec. 18, 2008, 4 pages.
Foreign Communication from a counterpart application, European Application 08800756.2, Extended European Search Report dated Apr. 3, 2011, 6 pages.

Traina, et al.: "Autonomous System Confederations for BGP; RFC 5065.txt", IEFT Standard, Internet Engineering Task Force, IEFT, CH, XP015055137, Aug. 2007.
PCT International Search Report; PCT Application No. PCT/CN2008/072244; Dec. 18, 2008; 2 pgs.
PCT International Preliminary Report on Patentability; PCT Application No. PCT/CN2008/072244; Mar. 24, 2010; 5 pgs.
Zhang, Xinyang, et al.; "Scaling IP Routing with the Core Router—Integrated Overlay"; ICNP '06 Proceedings of the Proceedings of the 2006 IEEE International Conference on Network Protocols; IEEE Computer Society Washington, DC; 2006; pp. 147-156.

* cited by examiner

METHOD AND DEVICE FOR MAINTAINING ROUTES

CROSS-REFERENCE TO RELATED APPLICATIONS

This application is a continuation of U.S. patent application Ser. No. 12/863,103, filed on Jul. 23, 2010, which is a continuation of International Application No. PCT/CN2008/072244, filed on Sep. 2, 2008, which claims priority to Chinese Patent Application No. 200710154506.8, filed on Sep. 17, 2007, all of which are hereby incorporated by reference in their entireties.

FIELD OF THE TECHNOLOGY

The present invention relates to a technology for transmitting data in a communications network, and more particularly to a method, system, and device for maintaining routes.

BACKGROUND

A route is used for transmitting data from source terminal equipment in a communications network to destination terminal equipment through a router. When data packets are transmitted, the router needs to select an optimal path and switch the data packets in the route maintained by the router. Metric is a calculation standard for determining the optimal path to reach the destination terminal equipment in a route algorithm. For example, in the standard, the optimal path can be determined with the shortest path or the smallest path overhead. In order to enable the router to select the path after the data packets are received, route initialization needs to be performed and a routing table including path information in the communications network needs to be maintained. The path information varies with different route algorithms that are used. A manner in which the router is informed of the path information of the destination terminal equipment or a next hop router is that the path information is issued in the communications network (can be issued by the router). After receiving the path information, the router can attempt to communicate with other routers or destination terminal equipment according to the received path information, so as to establish the routing table for forwarding the data packets for the router itself. The established routing table includes all kinds of information such as distance information, information of the hop count to reach the destination terminal equipment, and address information of the next hop. Likewise, Metric varies with different route algorithms that are used. After receiving data carrying a destination address, the router selects, according to the carried destination address, the optimal path to transmit data packets to the next hop router or destination terminal equipment in a routing table that adopts Metric. For example, Metric determines the optimal path according to the shortest path. At this time, after selecting, according to distance information in the routing table, a path with the shortest distance to reach the destination address as the optimal path, the router can transmit the data packets to the next hop router or destination terminal equipment.

In this way, the routers communicate with each other, and maintain and update their own routes by exchanging the path information. The maintenance and update of their own routes are generally maintaining and updating a routing table including all or partial information, and a network topology view is established by analyzing path information from other routers or terminal equipment. Transmission of the path information among the routers can further adopt a mode of sending broadcast information in a linked state. The routers notify a linked state of other routers sending the broadcast information. The linked state information is used for establishing a complete topological view, so that the routers can determine the optimal path when transmitting data packets.

When the routes are deployed in the communications network, a multi-homing technology and a traffic engineering technology are adopted. The multi-homing technology is for link survivability or load balance. A link group with more than one link is established between the terminal equipment and a backbone network of the communications network. The link group with more than one link may belong to the same operator or different operators. The traffic engineering technology is actually a suit of tools and methods adopted by the communications network. Regardless of whether the terminal equipment and transmission lines in the communications network are normal or failed, an optimal service can be extracted from the configured communications network, which can optimize allocated resources. With the establishment of the communications network based on the multi-homing technology and wide deployment of the traffic engineering technology in the communications network, the number of routes in one communications network increases quickly, which leads to the following results. On the one hand, in a router a larger capacity storage routing table needs to be set, which results in cost increase. On the other hand, due to the large number of routes maintained by the router, route convergence of the router becomes slow, that is, a rate of route processing on data becomes slow, which results in a reaction rate of data transmission of the communications network becomes low and work efficiency of the entire communications network is influenced.

In order to solve the foregoing problems, a core-router integrated overlay (CRIO) technology is proposed in the communications network. FIG. 1 is a schematic structural view of a network adopting the CRIO technology to maintain routes in the prior art, where the network includes a transmission network and edge networks. Different edge networks are connected through the transmission network. The transmission network includes one or more point of presence (PoP) nodes. An edge network includes terminal equipment. A border router is included at a boundary between the transmission network and the edge network. In FIG. 1, for simplicity, one PoP node is shown.

Routes maintained by different PoP nodes are routing information of different super prefixes and routing information of a detailed prefix covered by the super prefixes. The different PoP nodes issue the routing information of the maintained super prefix in the transmission network. However, the routing information of the detailed prefix covered by the super prefix does not need to be issued. Border routers of autonomous systems (AS's) and other core routers in the transmission network do not need to maintain all routing information of the detailed prefix covered by the super prefix and only need to maintain routes of the super prefix.

Here, the routing information of the super prefix can also be referred to as converged routing information.

Here, the routing information of the detailed prefix covered by the super prefix is routing information in the edge network related to the super prefix.

The terminal equipment accesses the transmission network through the border router. When data packets are transmitted, source terminal equipment sends the data packets to a source end border router. According to stored routing information of the super prefix corresponding to a destination address, the source end border router sends data to a PoP node maintaining the routing information of the super prefix. The PoP node determines a path through the maintained routing information of the detailed prefix covered by the super prefix, so as to establish a tunnel between the PoP node and a destination end border router. The data packets are forwarded to the destination end border router through the tunnel. The destination end border router forwards the data packets to destination terminal equipment according to routing information stored by the destination end border router itself.

In practical applications, the transmission network may be a backbone network of the Internet, and the PoP node may be a super router or a host.

A basic idea of adopting the CRIO technology in a network is how to reduce route capacity of the backbone network of the Internet. It is found, based on a model of flow of practical transmission data of the Internet, that flow of data sent to the terminal equipment corresponding to a few network segment addresses occupies a large portion of bandwidth. Therefore, during transmission, the terminal equipment that transmits data packets with less flow can increase the hop count to reduce the route capacity of the backbone network of the Internet. A basic realization idea is to change a mesh routing structure of the Internet into a tree routing structure. As shown in FIG. 1, the routing information of the super prefix is issued only through the PoP nodes in the backbone network of the Internet while the routing information of the detailed prefix covered by the super prefix is not issued in the backbone network of the Internet. A border router of the backbone network of the Internet provides the routing information of the detailed prefix under the super prefix to a PoP node dominating the routing information of the super prefix and the PoP node stores the routing information of the detailed prefix.

In this way, other routers or equipments in the backbone network of the Internet only need to maintain the routing information of the super prefix and no longer need to maintain lots of routing information respectively, so that the route capacity of the backbone network of the Internet is reduced.

When data packets are forwarded, the data packets are first forwarded to a PoP node that issues the routing information of the super prefix. The PoP node saves the routing information of the detailed prefix covered by the super prefix, finds a corresponding detailed prefix route by searching the mapping relation, then establishes a tunnel between a PoP node and the border router corresponding to the detailed prefix route according to the detailed prefix route, and forwards the foregoing data packets to the border router through the tunnel.

Advantages of establishing and maintaining routes in the communications network by adopting the CRIO technology are as follows. Because other routers in the transmission network only need to maintain the routing information of the super prefix and do not need to maintain all routing information of the detailed prefix covered by the super prefix, the number of routes maintained by most routers is significantly reduced in the transmission network, processing burden and oscillation during data transmission in the communications network by adopting the Border Gateway Protocol (BGP) are reduced, and convergence of BGP routes is accelerated.

In a process of implementing the present invention, the inventor finds that the prior art has at least the following problems.

Because all the data packets to be transmitted in the communications network need to reach a PoP node and then perform relay transmission, the hop count that the transmitted data packets are forwarded is increased. Additionally, the PoP node needs to forward lots of data packets having a destination address that is in a network segment covered by stored routes of the super prefix, which raises very high requirements for forwarding capability of the PoP node. When the number of the forwarded data packets is too large, breakdown of the PoP node might Occur.

SUMMARY

Accordingly, the present invention is directed to a method for maintaining routes, so as to reduce flow of data packet forwarded by each PoP node in a case of maintaining routes by adopting the core-router integrated overlay (CRIO) technology.

The present invention is further directed to a system for maintaining routes, which reduces flow of data packets forwarded by each PoP node in a case of maintaining routes by adopting the CRIO technology.

The present invention is further directed to a device for maintaining routes, which reduces flow of data packets forwarded by each PoP node in a case of maintaining routes by adopting a CRIO technology.

According to the foregoing purposes, technical solutions according to aspects of the present invention are implemented as follows.

According to a first aspect of the present invention, a method for maintaining routes is provided. The method is applied to a communications network including multiple PoP groups, where each of the multiple PoP groups includes one or more PoP nodes. The method includes the following steps.

PoP nodes within the same PoP group issue routing information of the same super prefix.

PoP nodes within different PoP groups issue routing information of different super prefixes.

Each PoP node acquires routing information of a detailed prefix covered by a super prefix issued by the PoP node and synchronizes the routing information of the detailed prefix with other PoP nodes within the same PoP group.

According to a second aspect of the present invention, a method for maintaining routes is provided, where the method includes the following steps.

Routing information of a super prefix issued by a PoP node is received and a routing table is generated. An address of the PoP node that issues the routing information of the super prefix is recorded in the routing table. Routing information of a detailed prefix within a connected edge network is registered with a proximate PoP node that issues the routing information of the super prefix covering the detailed prefix.

According to a third aspect of the present invention, a system for maintaining routes is provided, where the system includes multiple routers and multiple PoP nodes.

The PoP nodes are configured to form different PoP groups, where PoP nodes within the same PoP group issue routing information of the same super prefix, and PoP nodes within different PoP groups issue routing information of different super prefixes. The PoP nodes acquire routing information of a detailed prefix covered by a super prefix issued by the PoP nodes and synchronize the routing information of the detailed prefix with other PoP nodes within the same PoP group.

The routers are configured to receive routing information of the super prefix issued by the PoP nodes.

According to a fourth aspect of the present invention, a PoP node for maintaining routes is provided, where the PoP node includes a route maintenance module, an issue module, a receiving module, and a synchronization module.

The route maintenance module is configured to store routing information of a super prefix.

The issue module is configured to issue routing information of a super prefix stored in the route maintenance module.

The receiving module is configured to receive routing information of a detailed prefix covered by the super prefix issued by the issue module and store the received routing information of the detailed prefix in the route maintenance module.

The synchronization module is configured to synchronize the routing information of the detailed prefix stored in the route maintenance module with other PoP nodes within the same PoP group.

According to a fifth aspect of the present invention, a border router for maintaining routes is provided, where the border router includes a route maintenance module, a receiving module, and a registration module.

The route maintenance module is configured to store an optimal route determined in routing information of a super prefix.

The receiving module is configured to receive routing information of a super prefix issued by a PoP node, determine the optimal route in the received routing information of the same multiple super prefixes, and save the optimal route in the route maintenance module.

The registration module is configured to register the routing information of the detailed prefix covered by the super prefix in the route maintenance module with a proximate PoP node that issues the routing information of the super prefix.

Compared with the prior art, the embodiments of the present invention have the following advantages. With the method, system, and device provided according to the embodiments of the present invention, multiple PoP groups are set in a transmission network, one or more PoP nodes are set within each PoP group, and PoP nodes within the same PoP group issue routing information of the same super prefix, respectively. The PoP nodes within different PoP groups issue routing information of different super prefixes. The PoP nodes within the same group maintain the routing information of the detailed prefix covered by the same super prefix. In this way, when different data packets are transmitted, different PoP nodes within the same group can share the load and forward the data packets, so that flow of data packets forwarded by each PoP node is reduced in a case of maintaining the routes by adopting the CRIO technology.

DETAILED DESCRIPTION OF THE EMBODIMENTS

To make the technical solution, objectives, and merits of the present invention more comprehensive, the embodiments of the present invention are described in detail with reference to the accompanying drawings.

In order to reduce flow of data forwarded by a PoP node in a case of maintaining routes by adopting the core-router integrated overlay (CRIO) technology, according to the embodiments of the present invention, multiple PoP groups are set in a transmission network, and one or more PoP nodes are set within each PoP group. PoP nodes within the same PoP group issue routing information of the same super prefix respectively; and PoP nodes within different PoP groups issue routing information of different super prefixes. The PoP nodes within the same group maintain the routing information of the detailed prefix covered by the same super prefix. In this way, when different data packets are transmitted, different PoP nodes within the same group can share load of the data packets and forward the data packets, so as to reduce flow of the data packets forwarded by each PoP node.

In the embodiments of the present invention, multiple PoP nodes within the same PoP group synchronize the maintained routing information of the detailed prefix covered by the same super prefix periodically or by adopting a set rule, and the process that multiple PoP nodes within the same PoP group synchronize the maintained routing information of the detailed prefix covered by the same super prefix. The process also may be performed by adopting the protocols in the prior art, such as the BGP and other protocols. The routing information of the detailed prefix covered by the same super prefix maintained by the multiple PoP nodes within the same PoP group can be preset and can also be obtained by registering the routing information of the detailed prefix within a connected edge network and covered by the super prefix with the PoP node by a border router.

In the embodiments of the present invention, the multiple PoP nodes within the same PoP group maintain the routing information of the detailed prefix covered by the same super prefix, that is, a routing table having mapping relations is set. The routing table includes the routing information of the detailed prefix corresponding to the super prefix. The routing information of the detailed prefix includes the detailed prefix, a routable address of the border router, and information such as priority and overhead.

In the embodiments of the present invention, the number of multiple PoP nodes within one group maintaining the routing information of the detailed prefix covered by the same super prefix is determined according to data flow of the network and capability of processing data by each PoP node.

Figure 1:
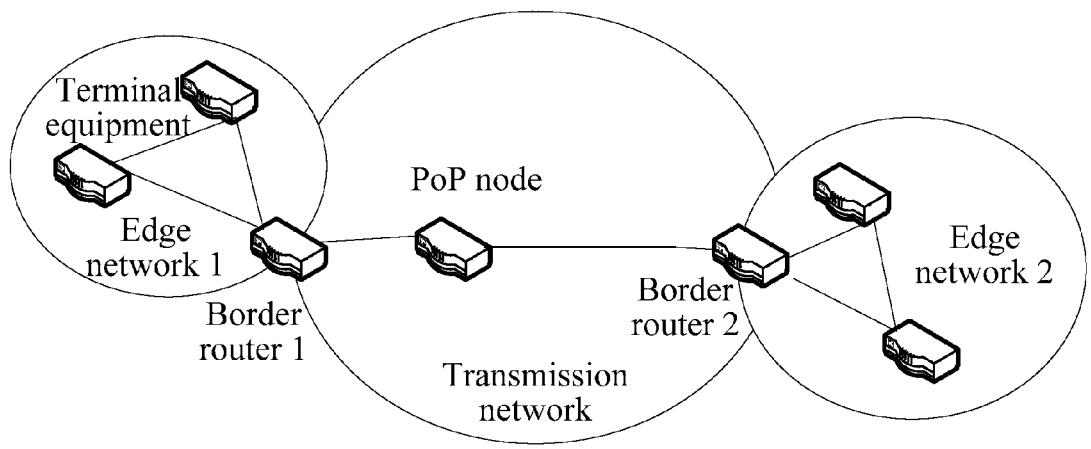
FIG. 1 is a schematic structural view of a network adopting the CRIO technology to maintain routes in the prior art.
Figure 2:
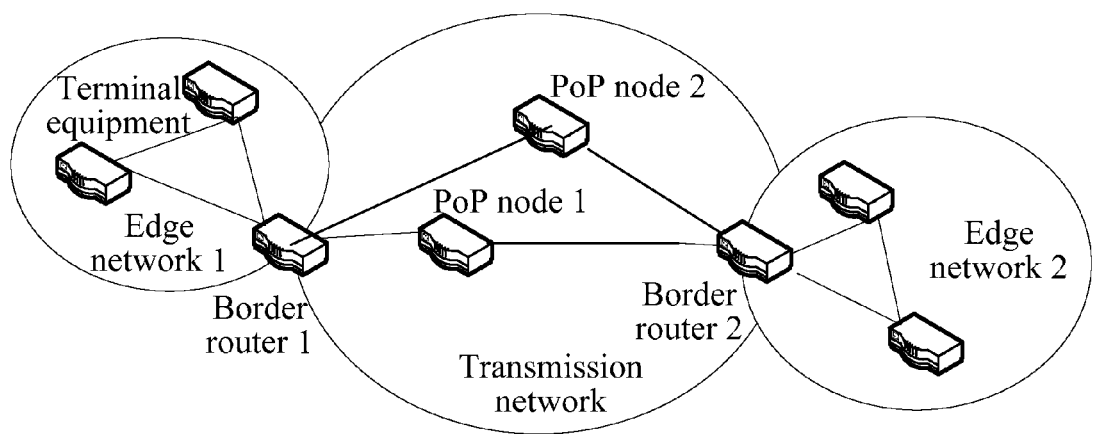
FIG. 2 is a schematic view of a system for maintaining routes according to an embodiment of the present invention.

FIG. 2 is a structural view of a system for maintaining routes according to an embodiment of the present invention. As shown in FIG. 2, the system includes a transmission network and edge networks. The edge networks are connected to the transmission network through border routers. The transmission network includes multiple PoP groups. Each group includes one or more PoP nodes. Additionally, the edge networks and the transmission network also include some ordinary routers.

In FIG. 2, for simplicity, only one PoP group is included and the PoP group has two PoP nodes.

PoP nodes within the same PoP group maintain routing information of detailed prefixes covered by the same super prefix respectively. PoP nodes within different PoP groups maintain routing information of detailed prefixes covered by different super prefixes.

The PoP nodes within the same PoP group issue the routing information of the same super prefix respectively. The PoP nodes within the different PoP groups issue the routing information of the different super prefixes.

The border routers receive the routing information of the super prefix issued by PoP nodes, generate a routing table, and register routing information of a detailed prefix within a connected edge network with a proximate PoP node that issues the routing information of the super prefix covering the detailed prefix. The different PoP nodes in the same PoP group synchronize the registered routing information of the detailed prefix.

When data packets are transmitted, according to the prior art, source terminal equipment sends data to a source end border router in an edge network according to routing information between the source terminal equipment and the source end border router. The source end border router sends a data packet to a proximate PoP node according to optimally matching routing information of the super prefix. The proximate PoP node determines a route of the destination end border router corresponding to an optimal route matching a destination address through the maintained routing information of the detailed prefix covered by the super prefix, so as to establish a tunnel between the proximate PoP node and the destination end border router, and send the data packet to the destination end border router. The destination end border router forwards data to destination terminal equipment according to its own stored routing information.

In the embodiment of the present invention, when multiple PoP nodes within one PoP group maintain the routing information of the detailed prefix covered by the same super prefix, a subsequent process of forwarding the data packets through the routing information maintained by one of the PoP nodes is the same with that in the prior art, and the description thereof is omitted here.

In the embodiment of the present invention, after receiving the routing information of the super prefix issued by multiple PoP nodes within one PoP group respectively, the border router needs to determine the proximate PoP node in the multiple PoP nodes that issue the routing information of the super prefix according to the routing information (information such as the shortest path or the smallest path overhead) of the super prefix. After determining that the routing information of the super prefix issued by the proximate PoP node is an optimal route and storing the routing information, the border router registers the routing information of the detailed prefix within a connected edge network and covered by the optimal route with the proximate PoP node.

In the embodiment of the present invention, the routing information of the super prefix issued by the multiple PoP nodes can be issued to the border router, and can also be issued to other routers, including a core router in the transmission network.

In practical applications, the transmission network can be a backbone network of the Internet and the PoP node is a super router or a host.

Figures 3, 4:
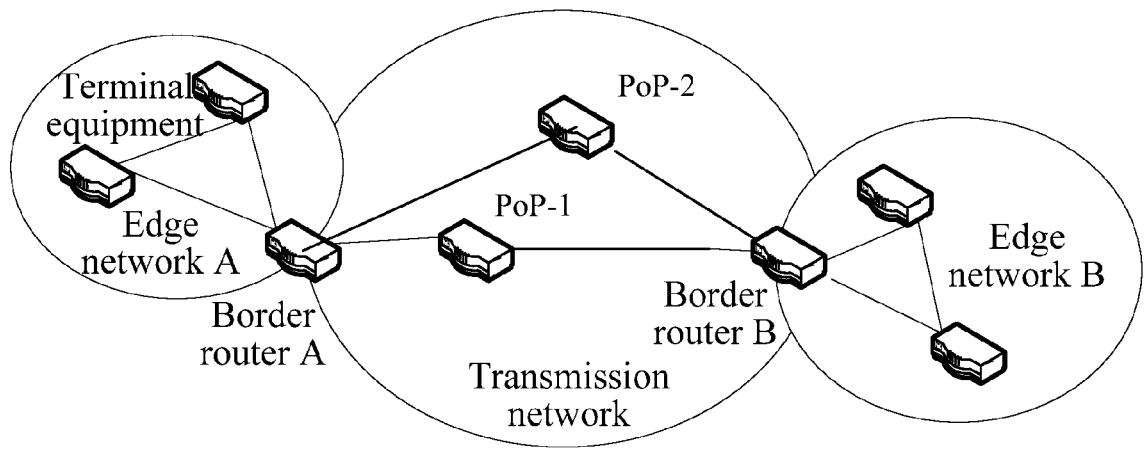
FIG. 3 is a flow chart of a method for maintaining routes according to an embodiment of the present invention.
FIG. 4 is a schematic view of a structure for maintaining routes according to an embodiment of the present invention.

FIG. 3 is a flow chart of a method for maintaining routes provided according to an embodiment of the present invention, where the method includes the following steps.

In step 301, multiple PoP groups are set in a communications network and one or more PoP nodes are set within each PoP group. PoP nodes within the same PoP group issue routing information of the same super prefix respectively. PoP nodes within different PoP groups issue routing information of different super prefixes.

The routing information of the same super prefix issued by the multiple PoP nodes within the same PoP group can be preset.

In step 302, PoP nodes acquire the routing information of the detailed prefix covered by the super prefix issued by the PoP nodes respectively and synchronize the routing information of the detailed prefix with other PoP nodes within the same PoP group.

The acquired routing information of the detailed prefix covered by the super prefix is preset in the PoP nodes that issue the routing information of the super prefix or dynamically registered by a border router in the communications network.

An existing protocol such as the BGP can be adopted for synchronizing the acquired routing information of the detailed prefix with the multiple PoP nodes within the same PoP group.

In the embodiment of the present invention, when detecting that the routing information of the detailed prefix within the connected edge network changes by adopting the prior art, a router performs registration update to the proximate PoP node that issues the routing information of the super prefix covering the detailed prefix.

After the proximate PoP node receives the registration update, the routing information of the detailed prefix maintained by the proximate PoP node is updated and update of the routing information is spread to other PoP nodes within the PoP group corresponding to the super prefix.

When data packets are transmitted, after receiving a data packet carrying a destination address through source terminal equipment, a source end border router routes the data packet to a proximate PoP node that issues the routing information of the super prefix according to optimally matching routing information of the super prefix. The proximate PoP node establishes a tunnel to reach a destination end border router through the maintained routing information of the detailed prefix covered by the super prefix. The data packet is sent to the destination end border router. The destination end border router forwards data to destination terminal equipment according to its own stored routes.

Hereinafter, the embodiments of the present invention are illustrated by taking one specific example. FIG. 4 is a schematic view of a structure for maintaining routes according to an embodiment of the present invention.

Two PoP nodes are set in a communications network to maintain routing information of the same super prefix and routing information of a detailed prefix covered by the super prefix. It is assumed that these two PoP nodes are a PoP-1 and a PoP-2. These two PoP nodes issue routing information of a super prefix with a network segment address 10.0.0.0/8 to the communications network. In the communications network, a network prefix of an edge network A is 10.1.0.0/16 and a network prefix of an edge network B is 10.2.0.0/16. A border router A of the communications network connected to the edge network A registers the routing information of the detailed prefix 10.1.0.0/16 with the PoP-1 that issues 10.0.0.0/8 closer to the border router A. A border router B of the communications network connected to the edge network B registers the routing information of the detailed prefix 10.2.0.0/16 with the PoP-2 that issues 10.0.0.0/8 closer to the border router B. The PoP-1 and the PoP-2 synchronize the registered routing information of the detailed prefix through existing protocols. After the synchronization, the routing information of the detailed prefix covered by the super prefix exist on both the PoP-1 and the PoP-2, that is, a border router corresponding to 10.1.0.0/16 is the border router A, and a border router corresponding to 10.2.0.0/16 is the border router B.

When connection between a border router and an edge network is interrupted, the border router issues a route delete message to a proximate PoP node that issues routing information of a super prefix covering an invalid detailed prefix, and carries routing information of the detailed prefix to be deleted. After receiving the route delete message, the PoP node deletes stored routing information of a corresponding detailed prefix and meanwhile notifies other PoP nodes within the same PoP group that the routing information of the detailed prefix is invalid. The other PoP nodes delete the routing information correspondingly. In other words, the routing information of the detailed prefix covered by the same super prefix maintained by multiple PoP nodes can be updated in real time.

The example is a mode of registering routes with multiple PoP nodes, and the mode of registering routes with multiple PoP nodes may also be pre-configured of course. For example, a border router corresponding to 10.1.0.0/16 is configured to be the border router A on the PoP-1 and a border router corresponding to 10.2.0.0/16 is configured to be the border router B on the PoP-2. Next, PoP nodes responsible for issuing the routing information of the super prefix 10.0.0.0/8 synchronize routing information.

In this way, a process for establishing and maintaining routes is completed in the communications network. At this time, data packets can be transmitted through the maintained routes. Hereinafter, how to transmit data is specifically illustrated.

After a data packet (the data packet carries a destination address) with a destination address 10.2.2.2 from the edge network A reaches the border router A along a default route (because only one route is present between the edge network and the border router A, the route is generally set as the default route), according to an optimal route matched by the destination address carried by the data packet, that is, a route of 10.0.0.0/8, the border router A forwards the data packet to a proximate PoP node that issues routing information of a super prefix 10.0.0.8, that is, the PoP-1, along the route of the super prefix 10.0.0.0/8. The PoP-1 searches the stored routing information to find that the optimal path to reach the destination address 10.2.2.2 is 10.2.0.0/16 and the corresponding border router is the border router B. After a data packet is sent to the border router B through the routing information of the detailed prefix reaching the border router B, the border router B forwards the data packet to destination terminal equipment according to a destination address carried by the data packet and according to routing information of the edge network B maintained by the border router B.

After a data packet (the data packet carries a destination address) with a destination address 10.1.1.1 from the edge network B reaches the border router B along a default route, according to an optimal route matched by the destination address carried by the data packet, that is, the route of 10.0.0.0/8, the border router B enables the data packet to reach a proximate PoP node that issues the routing information of the super prefix 10.0.0.8, that is, the PoP-2, along the route of the super prefix 10.0.0.0/8. The PoP-2 searches the stored routing information to find that the optimal path to reach the destination address 10.1.1.1 is 10.1.0.0/16, and a corresponding border router is the border router A. After a data packet is sent to the border router A through a route reaching the border router A, the border router A forwards the data packet to destination terminal equipment according to a destination address carried by the data packet and according to routing information of the edge network A maintained by the border router A.

Figure 5:
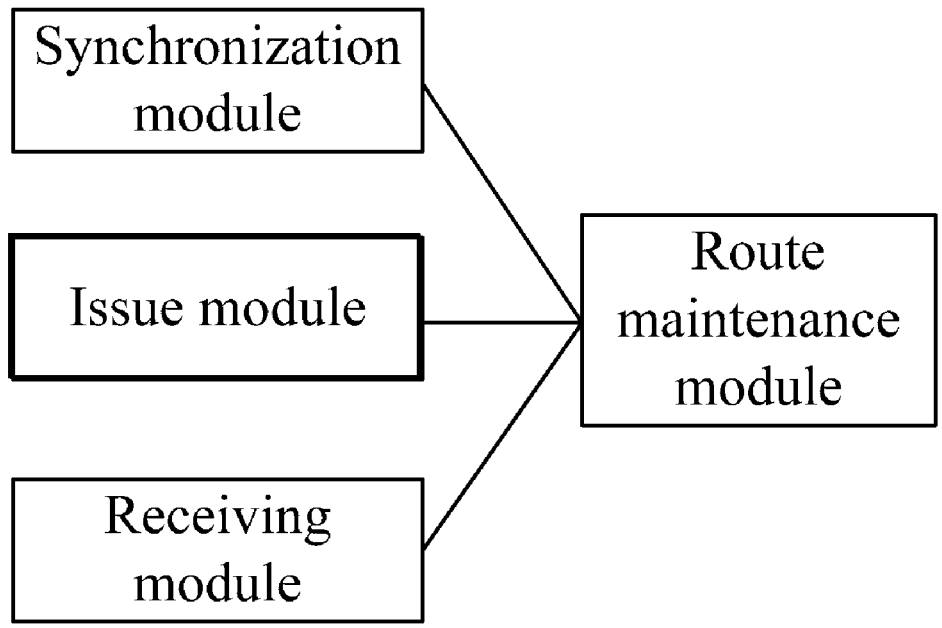
FIG. 5 is a schematic structural view of a PoP node according to an embodiment of the present invention.

In order to realize that multiple PoP nodes of the same PoP group maintain the routing information of the detailed prefix covered by the same super prefix, in an embodiment, the present invention further provides a PoP node, where the PoP node includes an issue module, a receiving module, a route maintenance module, and a synchronization module, as shown in FIG. 5.

The route maintenance module is configured to store routing information of a super prefix.

The issue module is configured to issue routing information of the super prefix stored in the route maintenance module.

The receiving module is configured to receive routing information of a detailed prefix covered by the super prefix issued by the issue module and store the received routing information of the detailed prefix in the route maintenance module.

The synchronization module is configured to synchronize the routing information of the detailed prefix stored in the route maintenance module with other PoP nodes within the same PoP group.

Figure 6:
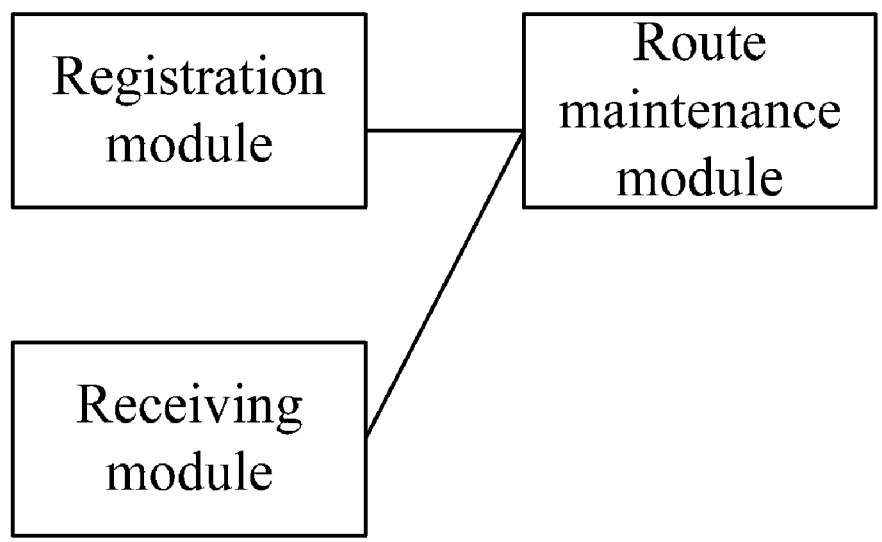
FIG. 6 is a schematic structural view of a border router according to an embodiment of the present invention.

A border router is further provided according to an embodiment of the present invention, where the border router includes a receiving module, a route maintenance module, and a registration module as shown in FIG. 6.

The route maintenance module is configured to store an optimal route determined in routing information of a super prefix.

The receiving module is configured to receive routing information of a super prefix issued by a PoP node, determine the optimal route in routing information of multiple super prefixes, and save the optimal route in the route maintenance module.

The registration module is configured to register the routing information of the detailed prefix covered by the super prefix in the route maintenance module with a proximate PoP node that issues the routing information of the super prefix.

It can be seen from the method and the system according to the embodiments of the present invention that, multiple PoP groups are deployed in a transmission network, and one or more PoP nodes are set within each PoP group. PoP nodes within the same PoP group maintain routing information of the same super prefix and routing information of a detailed prefix covered by the super prefix respectively. PoP nodes within different PoP groups maintain routing information of different super prefixes and routing information of detailed prefixes covered by different super prefixes. In this way, a data packet can be forwarded through a proximate PoP node within a PoP group, and a hop count of forwarding the data packet is reduced compared with route maintenance by adopting the CRIO technology in the prior art. Meanwhile, it can be achieved that a certain data packet of a network segment address corresponding to the routing information of the super prefix is forwarded to a proximate PoP node that issues the routing information of the super prefix according to principles such as the shortest path or the smallest path overhead of routes. Different PoP nodes forward data packets of the routing information of the same super prefix so that load sharing among different PoP nodes is achieved.

Through the descriptions of the preceding embodiments, those skilled in the art may understand that the present invention may be implemented by using hardware only or by using software and a necessary universal hardware platform. Based on such understandings, the technical solution of the present invention may be embodied in the form of a software product. The software product may be stored in a nonvolatile storage medium, which can be a Compact Disk Read-Only Memory (CD-ROM), Universal Serial Bus (USB) flash drive, or a removable hard drive. The software product includes a number of instructions that enable a computer device (personal computer, server, or network device) to execute the methods provided in the embodiments of the present invention.

The above descriptions are merely some exemplary embodiments of the present invention, but not intended to limit the scope of the present invention. Any modification, equivalent replacement, or improvement made without departing from the spirit and principle of the present invention should fall within the scope of the present invention.

What is claimed is:

1. A method for maintaining routes, applied in a communications network comprising multiple point of presence (PoP) groups, wherein each of the PoP groups comprises one or more PoP nodes, the method comprising:
   issuing, by PoP nodes within the same PoP group, routing information of a same super prefix;
   issuing, by PoP nodes within different PoP groups, routing information of different super prefixes;
   acquiring, by each PoP node, routing information of a detailed prefix covered by a super prefix issued by the PoP node itself from an edge network of the PoP node, wherein the acquired routing information of the detailed prefix covered by the super prefix is preset in the PoP node that issues the routing information of the super prefix or registered by a border router in the communications network dynamically, and wherein dynamically registering, by the border router in the communications network, the routing information of the detailed prefix covered by the super prefix comprises: receiving, by the border router, the routing information of the super prefix issued by the PoP node, generating a routing table, recording an address of the PoP node that issues the routing information of the super prefix in the routing table, and registering, by the border router, the routing information of the detailed prefix within the connected edge network with a proximate PoP node that issues the routing information of the super prefix covering the detailed prefix; and
   synchronizing, by each PoP node, the acquired routing information of the detailed prefix with the other PoP nodes within the same PoP group to make each PoP node to get routing information of all detailed prefixes covered by the super prefix.

2. The method according to claim 1, wherein the routing information of the super prefix issued by the PoP node is preset.

3. The method according to claim 1, wherein the routing information of the detailed prefix comprises the detailed prefix and a routable address, priority, and overhead information of the border router.

4. The method according to claim 1, further comprising forwarding a data packet, wherein the method comprises: hop-by-hop forwarding the data packet to the proximate PoP node that issues the routing information of the super prefix according to matching routing information of the super prefix, searching, by the proximate PoP node, a route optimally matching a destination IP address of the data packet in the routing table, determining an address of the border router corresponding to the optimal route, and sending the data packet to the border router in a tunnel mode.

5. The method according to claim 1 further comprising:
   when the routing information of the detailed prefix within the edge network connected to a border router changes, performing registration update, by the border router, to a proximate PoP node that issues the routing information of the super prefix covering the detailed prefix; and
   after the proximate PoP node receives the registration update, updating the routing information of the detailed prefix maintained by the proximate PoP node, and spreading the routing information update to other PoP nodes within the PoP group corresponding to the super prefix.

6. The method according to claim 1 further comprising:
   when the routing information of the detailed prefix within the edge network connected to the border router changes, performing registration update, by the border router, to the proximate PoP node that issues the routing information of the super prefix covering the detailed prefix; and
   after the proximate PoP node receives the registration update, updating the routing information of the detailed prefix maintained by the proximate PoP node, and spreading the routing information update to other PoP nodes within the PoP group corresponding to the super prefix.

7. The method according to claim 1, wherein the PoP nodes within the same PoP group synchronize routing information by using the Border Gateway Protocol (BGP).

8. A point of presence (PoP) node for maintaining routes, comprising:
   a route maintenance module that stores routing information of a super prefix;
   an issue module that issues routing information of a super prefix stored in the route maintenance module, wherein the routing information of a same super prefix is issued within the same PoP group, and the routing information of different super prefixes is issued within different PoP groups;
   a receiver implemented in hardware that receives routing information of a detailed prefix covered by a super prefix issued by the PoP node itself from an edge network of the PoP node, and stores the received routing information of the detailed prefix in the route maintenance module; and
   a synchronization module that synchronizes the routing information of the detailed prefix stored in the route maintenance module with other PoP nodes within the same PoP group to make each PoP node to get routing information of all detailed prefixes covered by the super prefix,
   wherein the received routing information of the detailed prefix covered by the super prefix is preset in the PoP node that issues the routing information of the super prefix or registered by a border router in the communications network dynamically, and
   wherein dynamically registering, by the border router in the communications network, the routing information of the detailed prefix covered by the super prefix comprises: receiving, by the border router, the routing information of the super prefix issued by the PoP node, generating a routing table, recording an address of the PoP node that issues the routing information of the super prefix in the routing table, and registering, by the border router, the routing information of the detailed prefix within the connected edge network with a proximate PoP node that issues the routing information of the super prefix covering the detailed prefix.

* * * * *

UNITED STATES PATENT AND TRADEMARK OFFICE
CERTIFICATE OF CORRECTION

| | | |
|---|---|---|
| PATENT NO. | : 8,065,434 B2 | Page 1 of 1 |
| APPLICATION NO. | : 12/982733 | |
| DATED | : November 22, 2011 | |
| INVENTOR(S) | : Xiaohu Xu | |

It is certified that error appears in the above-identified patent and that said Letters Patent is hereby corrected as shown below:

Title page, Item (30) Foreign Application Priority Data should read 200710154506.8

Signed and Sealed this
Twenty-seventh Day of December, 2011

David J. Kappos
*Director of the United States Patent and Trademark Office*